(12) United States Patent
Son et al.

(10) Patent No.: US 10,006,377 B2
(45) Date of Patent: Jun. 26, 2018

(54) CONTINUOUS VARIABLE VALVE DURATION APPARATUS AND ENGINE PROVIDED WITH THE SAME

(71) Applicant: HYUNDAI MOTOR COMPANY, Seoul (KR)

(72) Inventors: You Sang Son, Suwon-si (KR); Kyoung Pyo Ha, Seongnam-si (KR); Back Sik Kim, Osan-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 143 days.

(21) Appl. No.: 15/278,818

(22) Filed: Sep. 28, 2016

(65) Prior Publication Data
US 2017/0167397 A1    Jun. 15, 2017

(30) Foreign Application Priority Data
Dec. 14, 2015  (KR) .................. 10-2015-0178653

(51) Int. Cl.
*F02D 13/02* (2006.01)
*F01L 13/00* (2006.01)
(Continued)

(52) U.S. Cl.
CPC .......... *F02D 13/0207* (2013.01); *F01L 1/047* (2013.01); *F01L 1/053* (2013.01);
(Continued)

(58) Field of Classification Search
CPC ............ F02D 13/0207; F02D 2041/001; F01L 13/0015; F01L 13/0036; F01L 1/053;
(Continued)

(56) References Cited

U.S. PATENT DOCUMENTS

| 4,694,789 A | * | 9/1987 | Frost | ....................... F01L 1/024 |
| | | | | 123/192.2 |
| 5,090,366 A | * | 2/1992 | Gondek | .................... F01L 1/08 |
| | | | | 123/90.12 |

(Continued)

FOREIGN PATENT DOCUMENTS

| JP | H06-185321 A | 7/1994 |
| JP | H09-41924 A | 2/1997 |

(Continued)

*Primary Examiner* — Mark Laurenzi
*Assistant Examiner* — Wesley Harris
(74) *Attorney, Agent, or Firm* — Brinks Gilson & Lione

(57) ABSTRACT

A continuous variable valve duration apparatus may include: a camshaft; first and second cam portions on which a cam is formed respectively, to which the camshaft is inserted and of which relative phase angles with respect to the camshaft are variable; first and second inner brackets transmitting rotation of the camshaft to the first and second cam portions respectively; a slider housing unit in which the first and second inner brackets are rotatably inserted and of which a relative positions with respect to the camshaft is variable; a control shaft parallel to the camshaft; a control rod eccentrically formed on the control shaft; a lifter on which a lifter hole and a rotation hole are formed; and a control portion selectively rotating the control shaft so as to controlling a position of the slider housing unit.

20 Claims, 11 Drawing Sheets

(51) Int. Cl.
  *F01L 1/047* (2006.01)
  *F01L 1/053* (2006.01)
  *F01L 1/356* (2006.01)
  *F02D 41/00* (2006.01)

(52) U.S. Cl.
  CPC ....... *F01L 13/0015* (2013.01); *F01L 13/0026* (2013.01); *F01L 13/0036* (2013.01); *F01L 1/356* (2013.01); *F01L 2001/0473* (2013.01); *F01L 2001/0475* (2013.01); *F01L 2001/0476* (2013.01); *F01L 2001/0537* (2013.01); *F01L 2013/103* (2013.01); *F01L 2740/00* (2013.01); *F02D 2041/001* (2013.01); *Y02T 10/18* (2013.01)

(58) Field of Classification Search
  CPC ....... F01L 2001/0475; F01L 2001/0476; F01L 2001/0473; F01L 2001/0537; F01L 2013/103; F01L 2740/00; F01L 1/356; F01L 13/0026; F01L 1/047; Y02T 10/18
  USPC .............................. 123/90.11, 90.15–90.17
  See application file for complete search history.

(56) References Cited

U.S. PATENT DOCUMENTS

| 5,924,334 A | 7/1999 | Hara et al. |
| 2002/0092488 A1* | 7/2002 | Aoyama ............. F01L 13/0021 123/90.16 |

FOREIGN PATENT DOCUMENTS

| JP | 5582195 B2 | 7/2014 |
| JP | 2015-117692 A | 6/2015 |

* cited by examiner

CONTINUOUS VARIABLE VALVE DURATION APPARATUS AND ENGINE PROVIDED WITH THE SAME

CROSS-REFERENCE TO RELATED APPLICATION

This application claims priority to and the benefit of Korean Patent Application No. 10-2015-0178653, filed on Dec. 14, 2015, the entire contents of which are incorporated herein by reference.

FIELD

The present disclosure relates to a continuous variable valve duration apparatus and an engine provided with the same.

BACKGROUND

The statements in this section merely provide background information related to the present disclosure and may not constitute prior art.

An internal combustion engine generates power by burning fuel in a combustion chamber in an air media drawn into the chamber. Intake valves are operated by a camshaft in order to intake the air, and the air is drawn into the combustion chamber while the intake valves are open. In addition, exhaust valves are operated by the camshaft, and a combustion gas is exhausted from the combustion chamber while the exhaust valves are open.

Optimal operation of the intake valves and the exhaust valves depends on a rotation speed of the engine. That is, an optimal lift or optimal opening/closing timing of the valves depends on the rotation speed of the engine. In order to achieve such optimal valve operation depending on the rotation speed of the engine, various researches, such as designing of a plurality of cams and a continuous variable valve lift (CVVL) that can change valve lift according to engine speed, have been undertaken.

Also, in order to achieve such an optimal valve operation depending on the rotation speed of the engine, research has been undertaken on a continuously variable valve timing (CVVT) apparatus that enables different valve timing operations depending on the engine speed. The general CVVT may change valve timing with a fixed valve opening duration.

However, the general CVVL and CVVT are complicated in construction and are expensive in manufacturing cost.

The above information disclosed in this Background section is only for enhancement of understanding of the background of the present disclosure and therefore it may contain information that does not form the prior art that is already known to a person of ordinary skill in the art.

SUMMARY

Various aspects of the present disclosure provide a continuous variable valve duration apparatus and an engine provided with the same which may vary opening duration of a valve according to operation conditions of an engine, with a simple construction.

A continuous variable valve duration apparatus according to one exemplary form of the present disclosure may include: a camshaft; first and second cam portions on which a cam is formed, respectively, the camshaft being inserted into the first and second cam portions of which relative phase angles with respect to the camshaft are variable; first and second inner brackets transmitting rotation of the camshaft to the first and second cam portions respectively; a slider housing unit in which the first and second inner brackets are rotatably inserted and of which a relative positions with respect to the camshaft is variable; a control shaft parallel to the camshaft and a control rod eccentrically formed on the control shaft; a lifter on which a lifter hole to be rotatably connected with the control rod is formed and on which a rotation hole where the slider housing unit is rotatably inserted into is formed and a control portion selectively rotating the control shaft so as to control a position of the slider housing unit.

The slider housing unit may include a connecting pipe inserted into the rotation hole, a first and a second slider housing bearings inserted into the connecting pipe in which the first and second inner brackets are rotatably inserted respectively and an outer slider housing connected with the connecting pipe.

The slider housing unit may further include a spacer disposed within the connecting pipe to inhibit or prevent rotations of the first and second inner brackets from being interrupted.

The continuous variable valve duration apparatus may further include a lifter bearing inserted into the lifter hole for rotatably supporting the control rod.

The continuous variable valve duration apparatus may further include a cam cap rotatably supporting the control shaft.

A cam key may be formed to the first and second cam portions respectively, a first sliding hole may be formed to the first and second inner brackets respectively, and a cam key pin, on which a cam key slot where the cam key is slidably inserted therein is formed, may be rotatably inserted into the each first sliding hole.

A second sliding hole may be formed to the first and second inner brackets respectively, a camshaft pin may be connected to the camshaft, and a slider pin, on which a camshaft pin slot where the camshaft pin is slidably inserted therein is formed, may be rotatably inserted into the each second sliding hole.

A second sliding hole may be formed to the first and second inner brackets respectively, and wherein the continuous variable valve duration apparatus may further include a slider pin including a pin body slidably inserted into camshaft and a pin head integrally formed with the pin body and rotatably inserted into the second sliding hole.

A camshaft oil hole may be formed to the camshaft along a length direction thereof, a body oil hole communicated with the camshaft oil hole may be formed to the pin body, and an oil groove communicated with the body oil hole may be formed to the pin head.

The cam may be formed as a pair, a cam cap connecting portion may be formed between the two cams (i.e., the paired cams) of at least one of the first cam portion or the second cam portion, and a cam cap may rotatably support the control shaft and the cam connecting portion.

The control portion may include a worm wheel connected to the control shaft, a worm gear engaged with the worm wheel, and a control motor selectively rotating the worm gear.

An engine according to an exemplary form of the present disclosure may include: a camshaft; first and second cam portions on which a cam is formed respectively, the camshaft inserted into the first and second cam portions of which relative phase angles with respect to the camshaft are variable; first and second inner brackets transmitting rotation of the camshaft to the first and second cam portions respectively; a slider housing unit in which the first and second inner brackets are rotatably inserted and of which a relative positions with respect to the camshaft is variable; a control shaft parallel to the camshaft and a control rod eccentrically formed on the control shaft; a lifter on which a lifter hole to be rotatably connected with the control rod is formed and on which a rotation hole where the slider housing unit is rotatably inserted into is formed and a control portion selectively rotating the control shaft so as to control a position of the slider housing unit.

The slider housing unit may include a connecting pipe inserted into the rotation hole, a first and a second slider housing bearings inserted into the connecting pipe in which the first and second inner brackets are rotatably inserted respectively and an outer slider housing connected with the connecting pipe.

The slider housing unit may further include a spacer disposed within the connecting pipe to inhibit or prevent rotations of the first and second inner brackets from being interrupted.

A guide surface may be formed to the outer slider housing to guide movement of the slider housing unit, and a carrier guide surface contacting the guide surface may be formed to a cam carrier.

The engine may further include a lifter bearing inserted into the lifter hole for rotatably supporting the control rod.

The engine may further include a cam cap rotatably supporting the control shaft.

A cam key may be formed to the first and second cam portions respectively, a first sliding hole may be formed to the first and second inner brackets respectively, and a cam key pin, on which a cam key slot where the cam key is slidably inserted therein is formed, may be rotatably inserted into the each first sliding hole.

A second sliding hole may be formed to the first and second inner brackets respectively, a camshaft pin may be connected to the camshaft, and a slider pin, on which a camshaft pin slot where the camshaft pin is slidably inserted therein is formed, may be rotatably inserted into the each second sliding hole.

A second sliding hole may be formed to the first and second inner brackets respectively, and wherein the engine may further include a slider pin including a pin body slidably inserted into camshaft and a pin head integrally formed with the pin body and rotatably inserted into the second sliding hole.

A camshaft oil hole may be formed to the camshaft along a length direction thereof, a body oil hole communicated with the camshaft oil hole may be formed to the pin body, and an oil groove communicated with the body oil hole may be formed to the pin head.

The cam may be formed as a pair, a cam cap connecting portion may be formed between the paired cams of at least one of the first cam portion or the second cam portion, and a cam cap may rotatably support the control shaft and the cam connecting portion.

The control portion may include a worm wheel connected to the control shaft, a worm gear engaged with the worm wheel, and a control motor selectively rotating the worm gear.

As described above, the continuous variable valve duration apparatus according to an exemplary form of the present disclosure may vary an opening duration of a valve according to operation conditions of an engine, with a simple construction.

The exemplary continuous variable valve duration apparatus of the present disclosure may be reduced in size and thus the entire height of a valve train may be reduced.

Since the continuous variable valve duration apparatus may be applied to an existing engine without excessive modification, thus productivity may be enhance and production cost may be reduced.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
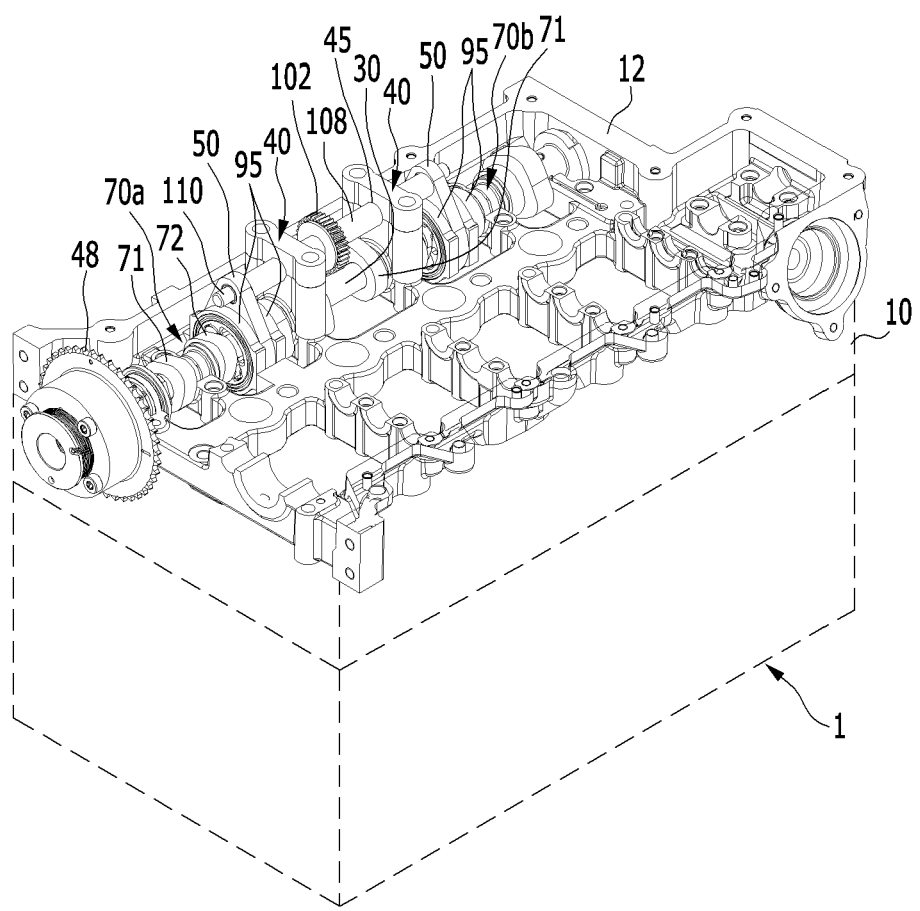
FIG. 1 is a perspective view of an engine provided with a continuous variable valve duration apparatus according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

A part irrelevant to the description will be omitted to clearly describe the present disclosure, and the same or similar elements will be designated by the same reference numerals throughout the specification.

In the drawings, the thickness of layers, films, panels, regions, etc., are exaggerated for clarity.

Throughout the specification and the claims, unless explicitly described to the contrary, the word "comprise" and variations such as "comprises" or "comprising", will be understood to imply the inclusion of stated elements but not the exclusion of any other elements.

Figure 2:
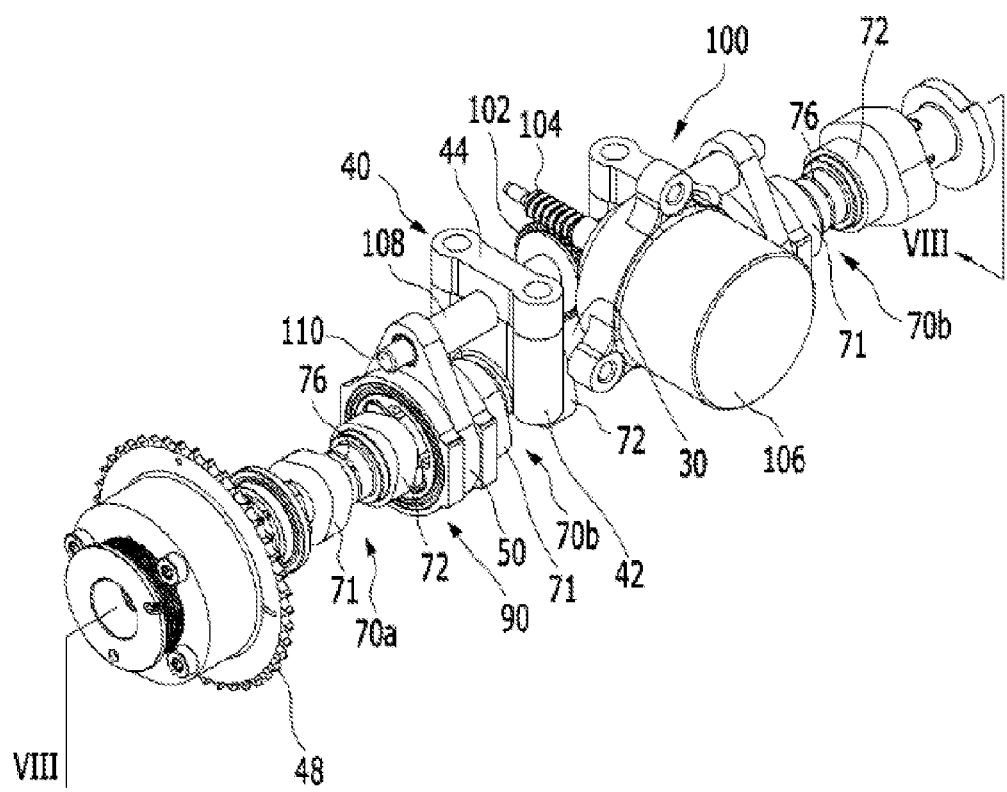
FIG. 2 is a perspective view of a continuous variable valve duration apparatus according to one form of the present disclosure.

FIG. 1 is a perspective view of an engine provided with a continuous variable valve duration apparatus, and FIG. 2 is a perspective view of a continuous variable valve duration apparatus.

Figure 3:
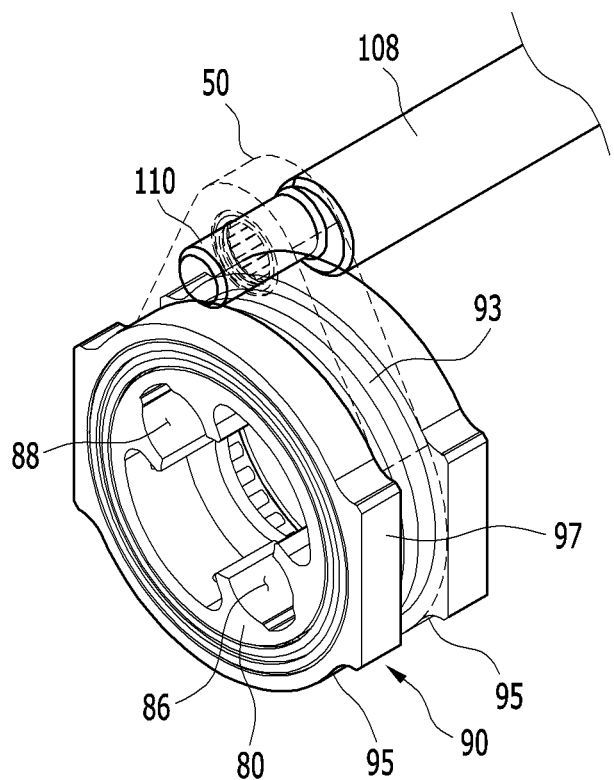
FIG. 3 is a partial perspective view of a lifter of an exemplary continuous variable valve duration apparatus of the present disclosure.
Figure 4:
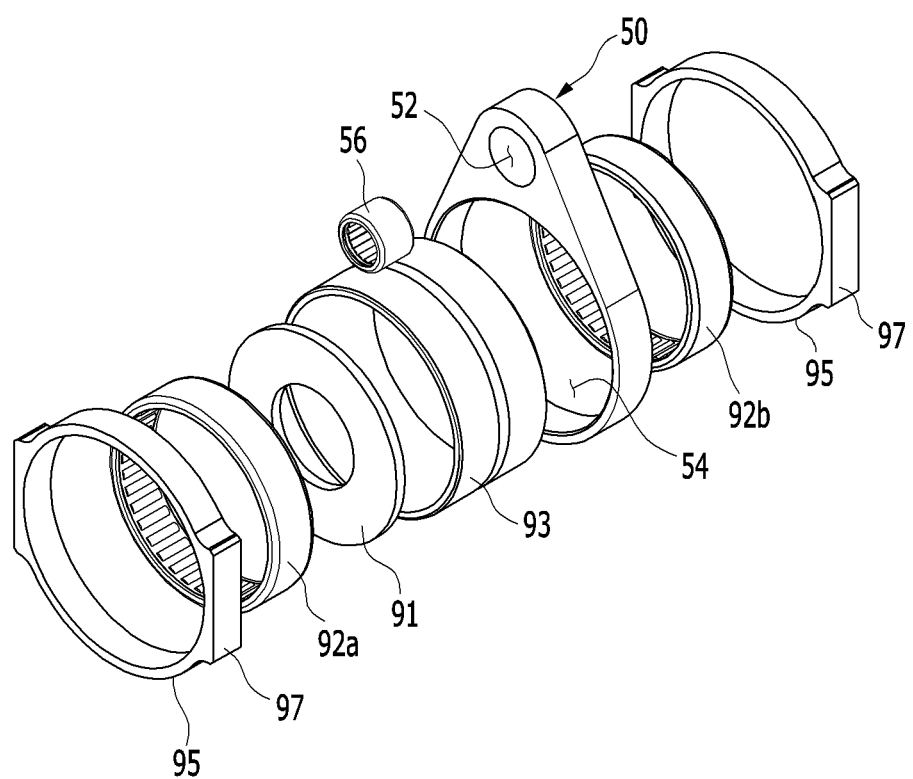
FIG. 4 is an exploded perspective view of a lifter of an exemplary continuous variable valve duration apparatus of the present disclosure.

FIG. 3 is a partial perspective view of a lifter of an exemplary continuous variable valve duration apparatus, and FIG. 4 is an exploded perspective view of a lifter of an exemplary continuous variable valve duration apparatus.

Figure 5:
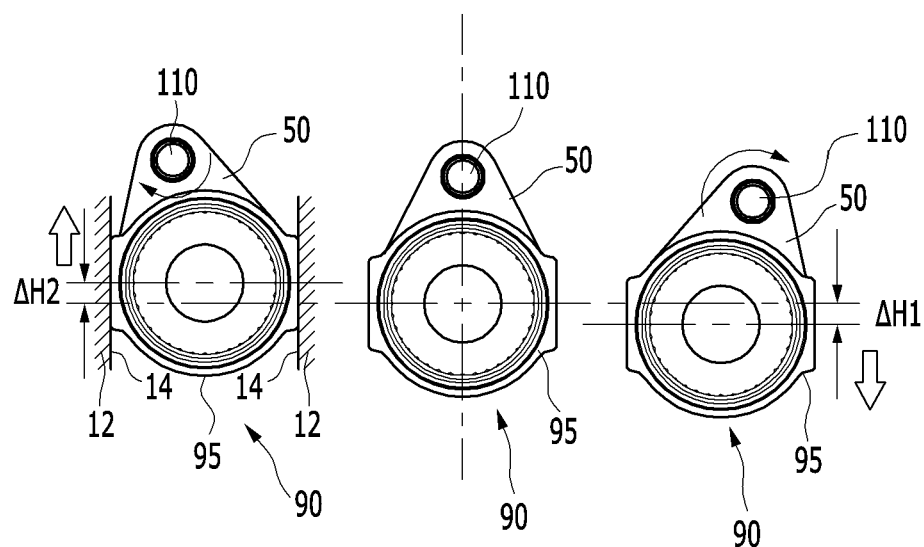
FIG. 5 is a drawing showing an operation of an exemplary continuous variable valve duration apparatus of the present disclosure.

FIG. 5 is a drawing showing an operation of an exemplary continuous variable valve duration apparatus.

Figure 6:
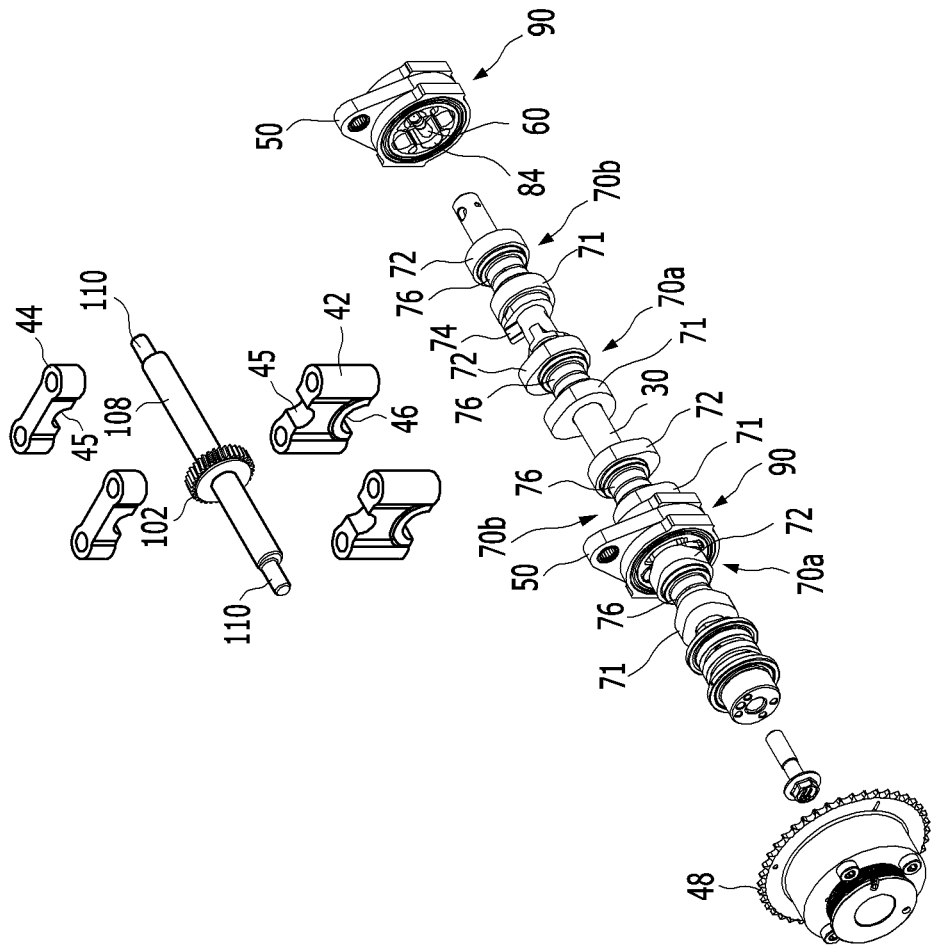
FIGS. 6 and 7 are exploded perspective views of an exemplary continuous variable valve duration apparatus of the present disclosure.
Figure 7:
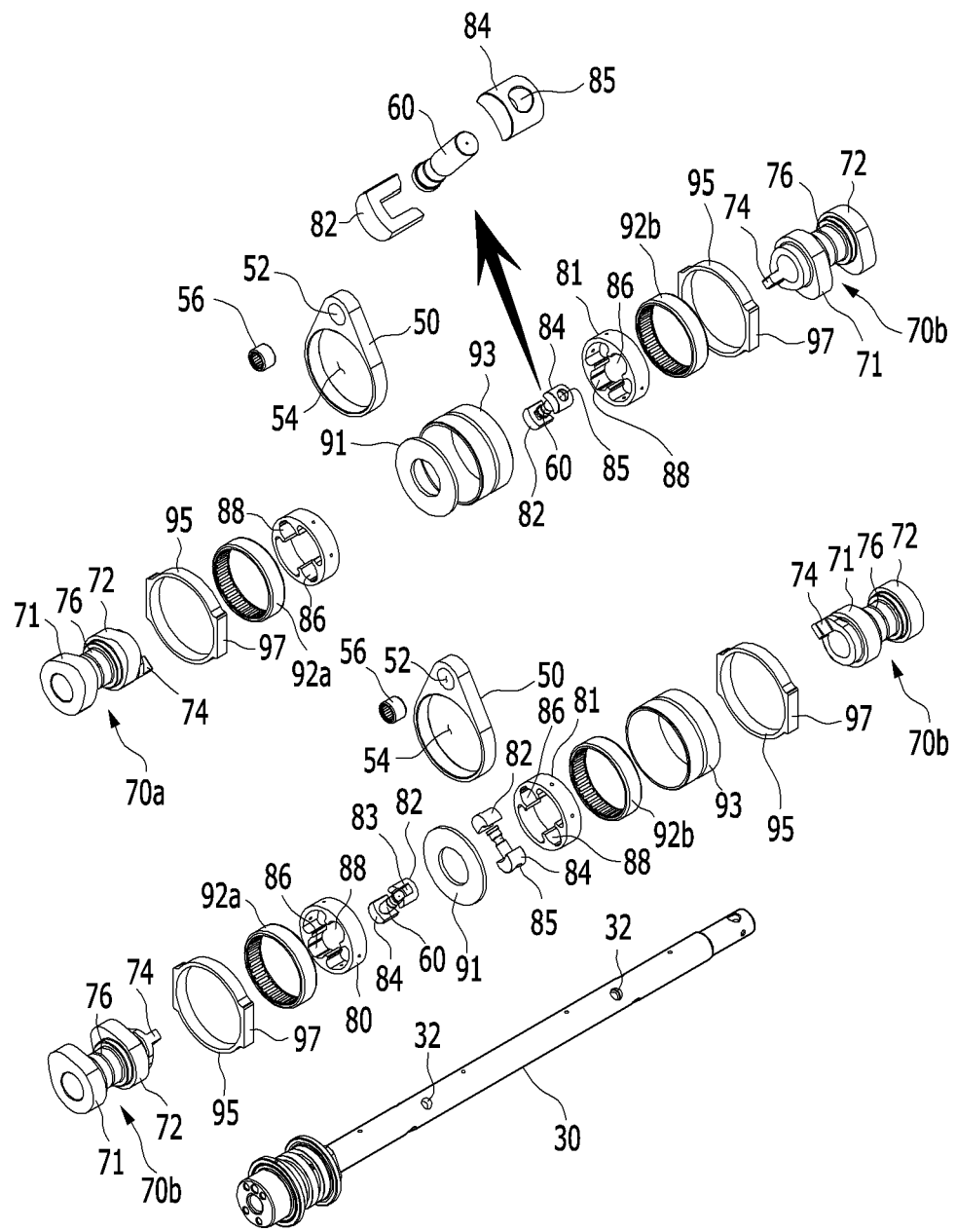
Figure 8:
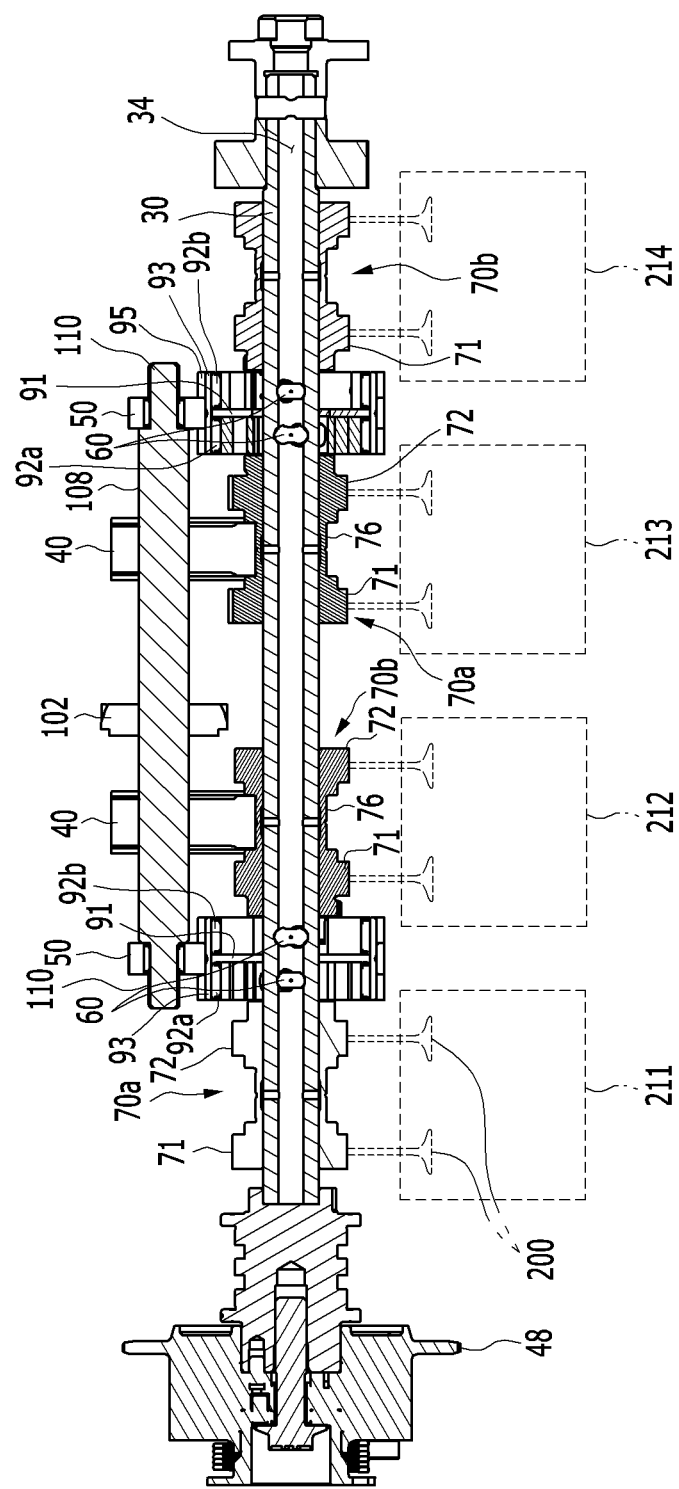
FIG. 8 is a cross-sectional view along line VIII-VIII of FIG. 2.

FIGS. 6 and 7 are exploded perspective views of an exemplary continuous variable valve duration apparatus, and FIG. 8 is a cross-sectional view along line VIII-VIII of FIG. 2.

Referring to FIGS. 1 to FIG. 6, an engine 1 includes a cylinder head 10, a cam carrier 12 mounted to the cylinder head 10 and a continuous variable valve duration apparatus mounted to the cam carrier 12.

The continuous variable valve duration apparatus includes: a camshaft 30; a first and second cam portions 70a and 70b on which a cam 71 and 72 is formed respectively, to which the camshaft 30 is inserted and of which relative phase angles with respect to the camshaft 30 are variable; a first and second inner brackets 80 and 81 transmitting rotation of the camshaft 30 to the first and second cam portions 70a and 70b respectively; a slider housing unit 90 in which the first and second inner brackets 80 and 81 are rotatably inserted and of which a relative positions with respect to the camshaft 30 is variable; a control shaft 108 which is parallel to the camshaft 30 and on which a control rod 110 is eccentrically formed; a lifter 50 on which a lifter hole 52 to be rotatably connected with the control rod 110 is formed and on which a rotation hole 54 where the slider housing unit 90 is rotatably inserted into is formed; and a control portion 100 selectively rotating the control shaft 108 for changing positions of the inner brackets 80a and 80b.

The camshaft 30 may be an intake camshaft or an exhaust camshaft and is rotated by a cam sprocket 48 connected to a crankshaft.

In the drawing, 4 cylinders 211, 212, 213 and 214 are formed to the engine, but it is not limited thereto.

The slider housing unit 90 includes a connecting pipe 93 inserted into the rotation hole 54, a first and a second slider housing bearings 92a and 92b inserted into the connecting pipe 93 in which the first and second inner brackets 80 and 81 are rotatably inserted respectively, and an outer slider housing 95 connected with the connecting pipe 93. In the drawings, the first and second slider housing bearings 92a and 92b are depicted as a needle bearing, however it is not limited thereto. On the contrary, various bearings such as a ball bearing, a roller bearing and so on may be applied thereto.

The slider housing unit 90 further includes a spacer 91 disposed within the connecting pipe 93 to inhibit or prevent rotations of the first and second inner brackets 80 and 81 from being interrupted.

A lifter bearing 56 is inserted into the lifter hole 52 for rotatably supporting the control rod 110.

A cam cap 40 is mounted to the cam carrier 12 for rotatably supporting the control shaft 108.

The cam cap 40 includes a cam cap column 42 and a cam cap cover 44 connected to the cam cap column 42. And a control shaft hole 45 is formed between the cam cap cover 44 and the cam cap column 42 for the control shaft 108 to be rotatably inserted therein.

Two cams 71 and 72 may be formed to the first and the second cam portion 70a and 70b respectively and a cam connecting portion 76 may be formed between the two cams 71 and 72.

A cam support hole 46 is formed to the cam cap 40 for rotatably supporting the cam connecting portion 76.

The cams 71 and 72 rotate and open the valve 200.

A cam key 74 is formed to the first and second cam portions 70a and 70b respectively, and a first sliding hole 86 and a second sliding hole 88 are formed to the first and second inner brackets 80 and 81 respectively.

A cam key pin 82 of which a cam key slot 83 where the cam key 74 is slidably inserted therein is formed thereto and the cam key pin 82 is rotatably inserted into the each first sliding hole 86.

A camshaft hole 32 is formed to the camshaft 30 and a camshaft pin 60 is inserted into the camshaft hole 32 to be connected to the camshaft 30. And a slider pin 84 of which a camshaft pin slot 85 where the camshaft pin 60 is slidably inserted therein is formed thereto and the slider pin 84 is rotatably inserted into the each second sliding hole 88.

A guide surface 97 is formed to the outer slider housing 95 for guiding movement of the slider housing unit 90, and a carrier guide surface 14 contacting the guide surface 97 is formed to the a cam carrier 12.

The carrier guide surface 14 leads movement of the slider housing unit 90 for inhibiting or preventing the slider housing unit 90 from vibrating.

The control portion 100 includes a worm wheel 102 connected to the control shaft 108, a worm gear 104 engaged with the worm wheel 102 and a control motor 106 selectively rotating the worm gear 104. By using the worm wheel 102 and the worm gear 104, the motor capacity of the control motor 106 may be reduced.

As shown in drawings, since the slider housing unit 90 is disposed between the first cam portion 70a and the second cam portion 70b, engine layout may be simplified and one slider housing unit 90 may control rotational speed of the first cam portion 70a and the second cam portion 70b simultaneously. Thus, the continuous variable valve duration apparatus may be constructed with simplified and elements number may be reduced.

That is, one connecting pipe 93 is disposed within one lifter 50, two inner brackets 80 and 81 are rotatably disposed within one connecting pipe 93, and the inner brackets 80 and 81 may change valve duration of two cylinders.

Since total elements are reduced, power loss of the engine may be reduced.

Figure 9:
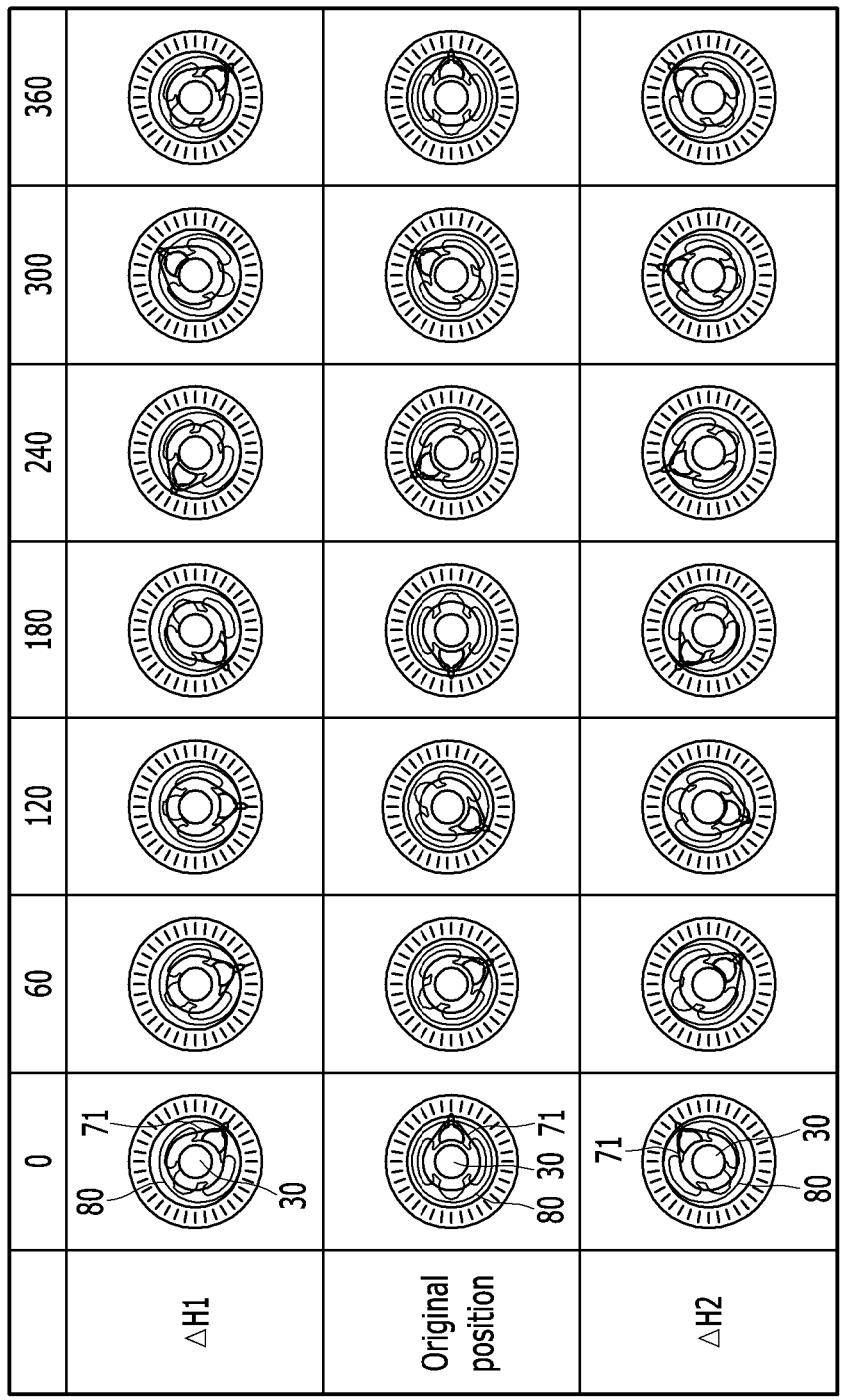
FIG. 9 is a table showing various operations of an exemplary continuous variable valve duration apparatus of the present disclosure.
Figure 10:
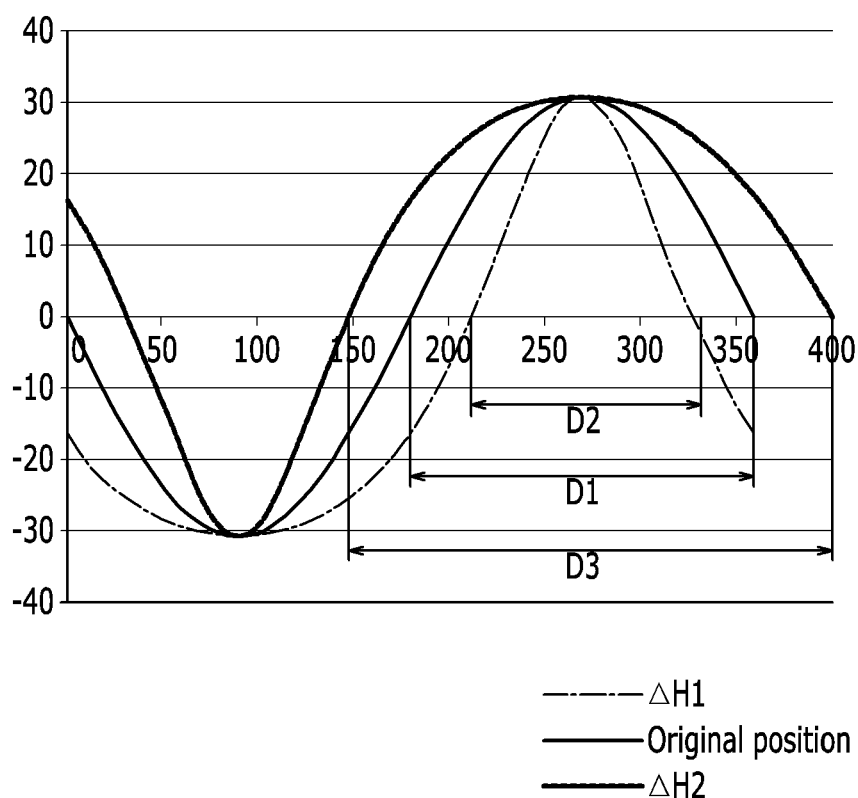
FIG. 10 is a graph showing various operations of an exemplary continuous variable valve duration apparatus of the present disclosure.

FIG. 9 is a table showing various operations of an exemplary continuous variable valve duration apparatus, and FIG. 10 is a graph showing various operations of an exemplary continuous variable valve duration apparatus.

Referring to FIG. 1 to FIG. 10, operations of the exemplary continuous variable valve duration apparatus will be described.

When rotation centers of the camshaft 30 and the first and second inner brackets 80 and 81 are coincident, that is, the slider housing unit 90 is positioned at an original position as shown in FIG. 9, the cams 71 and 72 rotate with the same phase angle of the camshaft 30. That is, the cams 71 and 72 and the camshaft 30 rotate with the same speed.

According to engine operation states, an ECU (engine control unit or electric control unit) transmits control signals to the control motor 106 of the control portion 100 to rotate the control shaft 108. Then, the control rod 110 eccentrically formed to the control shaft 108 is rotated to move the lifter 50 and the slider housing unit 90.

Since the lifter 50 is rotated and pushes or draws the slider housing unit 90, the slider housing unit 90 may be moved smoothly.

In one form, the slider housing unit 90 and the first and second inner brackets 80 and 81 relatively move upward or downward with respect to the camshaft 30.

When, the position of the slider housing unit 90 with respect to the camshaft 30 is changed, the relative rotation speed of the cams 71 and 72 with respect to the rotation speed of the camshaft 30 are changed.

While the camshaft pin 60 is rotated together with the camshaft 30, the camshaft pin 60 is slidable within the camshaft pin slot 85, the slider pin 84 is rotatably inserted into the second sliding hole 88, the cam key pin 82 is rotatably inserted into the first sliding hole 86, and the cam key 74 is slidable within the cam key slot 83. Thus the relative rotation speed of the cams 71 and 72 with respect to the rotation speed of the camshaft 30 is changed.

As shown in FIG. 5, while the phase angle of the camshaft 30 is constantly changed when the relative position of the slider housing unit 90 with respect to the rotation center of the camshaft 30 is changed downward as ΔH1, as shown in FIG. 9, the rotation speed of the cams 71 and 72 is relatively slower than rotation speed of the camshaft 30 near 60 to 120 degree, then then the rotation speed of the cams 71 and 72 is relatively faster than rotation speed of the camshaft 30 near 240 to 300 degree.

As shown in FIG. 5, while the phase angle of the camshaft 30 is constantly changed when the relative position of the slider housing unit 90 with respect to the rotation center of the camshaft 30 is changed upward as ΔH2, as shown in FIG. 9, the rotation speed of the cams 71 and 72 is relatively faster than rotation speed of the camshaft 30 near 60 to 120 degree, then the rotation speed of the cams 71 and 72 is relatively slower than rotation speed of the camshaft 30 near 240 to 300 degree.

That is, as shown in FIG. 10, valve duration D2 in the case that the relative position of the slider housing unit 90 is changed to ΔH1 is shorter than valve duration D1 in the case that the position of the slider housing unit 90 is at the original position.

Also, valve duration D3 in the case that the relative position of the slider housing unit 90 is changed to ΔH2 is longer than valve duration D1 in the case that the position of the slider housing unit 90 is at the original position.

For better comprehension and ease of description, peak points in FIG. 10 are constant, but it is not limited thereto.

According to adjusting contacting positions of the valve 200 and the cam 71 and 72, contacting angles of the valve 200 and the cam 71 and 72, a position of the cam key 74 and so on, valve duration may be enlarged by advancing opening timing and retarding closing timing of the valve 200. Or, valve duration may be shortened by retarding opening timing and advancing closing timing of the valve 200.

Also, opening timing of the valve 200 may be constant and closing timing of the valve 200 may be retarded or advanced as requested.

Also, closing timing of the valve 200 may be constant and opening timing of the valve 200 may be retarded or advanced as requested.

Figure 11:
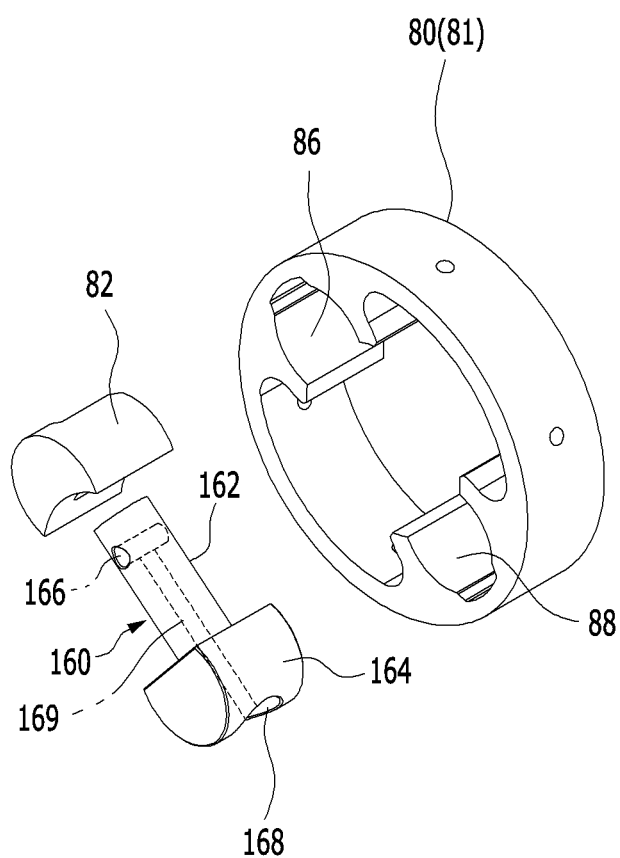
FIG. 11 is a drawing showing a slider pin of a continuous variable valve duration apparatus according to a modified form of the present disclosure.

FIG. 11 is a drawing showing a slider pin of a continuous variable valve duration apparatus according to a modified form of the present disclosure.

In the exemplary form, the camshaft pin and the slider pin are disconnected, however a slider pin 160 as shown in FIG. 11 includes a pin body 162 slidably inserted into the camshaft hole 32 of camshaft 30 and a pin head 164 integrally formed with the pin body 162 and rotatably inserted into the second sliding hole 88.

A camshaft oil hole 34 (referring to FIG. 8) is formed to the camshaft 30 along a length direction thereof and a body oil hole 166 communicated with the camshaft oil hole 34 is formed to the pin body 162.

And an oil groove 168 communicated with the body oil hole 166 is formed to the pin head 164 through a communicating hole 169.

Since lubricant may be supplied from the camshaft oil hole 34 to the oil groove 168 through the body oil hole 166 and the communicating hole 169, thus friction between the pin head 164 and the second sliding hole 88 may be reduced.

Except the slider pin, operations and structures of the continuous variable valve duration apparatus according to a modified form of the present disclosure are the same of the exemplary form described above, repeated description will be omitted.

As described above, the exemplary continuous variable valve duration apparatus of the present disclosure may perform various valve durations according to operation conditions of an engine.

The exemplary continuous variable valve duration apparatus of the present disclosure may be reduced in size and thus the entire height of a valve train may be reduced.

Since the continuous variable valve duration apparatus may be applied to an existing engine without excessive modification, thus productivity may be enhance and production cost may be reduced.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

<Description of symbols>

| | |
|---|---|
| 1: engine | 10: cylinder head |
| 12: cam carrier | 14: carrier guide surface |
| 30: camshaft | 32: camshaft hole |
| 40: cam cap | 42: cam cap column |
| 44: cam cap cover | 45: control shaft hole |
| 46: cam support hole | 48: cam sprocket |
| 50: lifter | 52: lifter hole |
| 54: rotation hole | 56: lifter bearing |
| 60: camshaft pin | 70a, 70b: first, second cam portion |
| 71, 72: cam | 74: cam key |
| 76: cam connecting portion | 80: first inner bracket |
| 81: second inner bracket | 82: cam key pin |
| 83: cam key slot | 84: slider pin |
| 85: camshaft pin slot | 86: first sliding hole |
| 88: second sliding hole | 90: slider housing unit |
| 91: spacer | 92a, 92b: first, second slider housing bearing |
| 93: connecting pipe | 95: outer slider housing |
| 97: guide surface | 100: control portion |
| 102: worm wheel | 104: worm gear |
| 106: control motor | 108: control shaft |
| 110: control rod | 160: slider pin |
| 162: pin body | 164: pin head |
| 166: body oil hole | 168: oil groove |
| 169: communicating hole | 200: valve |
| 211-214: 1-4 cylinders | |

What is claimed is:

1. A continuous variable valve duration apparatus comprising:
   a camshaft;
   first and second cam portions on which a cam is formed, respectively, the camshaft being inserted into the first and second cam portions of which relative phase angles with respect to the camshaft are variable;

first and second inner brackets configured to transmit rotation of the camshaft to the first and second cam portions respectively;
a slider housing unit in which the first and second inner brackets are rotatably inserted, a relative position of the slider housing unit with respect to the camshaft being variable;
a control shaft parallel to the camshaft, and a control rod being eccentrically formed on the control shaft;
a lifter on which a lifter hole to be rotatably connected with the control rod is formed and on which a rotation hole where the slider housing unit is rotatably inserted into is formed; and
a control portion configured to selectively rotate the control shaft so as to control a position of the slider housing unit.

2. The continuous variable valve duration apparatus of claim 1, wherein the slider housing unit comprises:
a connecting pipe inserted into the rotation hole;
a first and a second slider housing bearings inserted into the connecting pipe in which the first and second inner brackets are rotatably inserted respectively; and
an outer slider housing connected with the connecting pipe.

3. The continuous variable valve duration apparatus of claim 2, wherein the slider housing unit further comprises a spacer disposed within the connecting pipe to inhibit rotations of the first and second inner brackets from being interrupted.

4. The continuous variable valve duration apparatus of claim 1, further comprising a lifter bearing inserted into the lifter hole and configured to rotatably support the control rod.

5. The continuous variable valve duration apparatus of claim 1, further comprising a cam cap configured to rotatably support the control shaft.

6. The continuous variable valve duration apparatus of claim 1, wherein
a cam key is formed to the first and second cam portions, respectively;
a first sliding hole is formed to the first and second inner brackets, respectively; and
a cam key pin, on which a cam key slot where the cam key is slidably inserted therein is formed, is rotatably inserted into the each first sliding hole.

7. The continuous variable valve duration apparatus of claim 6, wherein
a second sliding hole is formed to the first and second inner brackets, respectively;
a camshaft pin is connected to the camshaft; and
a slider pin, on which a camshaft pin slot where the camshaft pin is slidably inserted therein is formed, is rotatably inserted into the each second sliding hole.

8. The continuous variable valve duration apparatus of claim 6, wherein
a second sliding hole is formed to the first and second inner brackets, respectively, and
wherein the continuous variable valve duration apparatus further comprises a slider pin including a pin body slidably inserted into the camshaft, and a pin head integrally formed with the pin body and rotatably inserted into the second sliding hole.

9. The continuous variable valve duration apparatus of claim 8, wherein a camshaft oil hole is formed to the camshaft along a length direction thereof;
a body oil hole communicated with the camshaft oil hole is formed to the pin body; and an oil groove communicated with the body oil hole is formed to the pin head.

10. The continuous variable valve duration apparatus of claim 1, wherein
the cam is formed as a pair;
a cam cap connecting portion is formed between the paired cams of at least one of the first cam portion or the second cam portion; and
a cam cap configured to rotatably support the control shaft and the cam connecting portion.

11. The continuous variable valve duration apparatus of claim 1, wherein the control portion comprises:
a worm wheel connected to the control shaft;
a worm gear engaged with the worm wheel; and
a control motor configured to selectively rotate the worm gear.

12. An engine comprising:
a camshaft;
first and second cam portions on which a cam is formed respectively, the camshaft being inserted into the first and second cam portions of which relative phase angles with respect to the camshaft are variable;
first and second inner brackets configured to transmit rotation of the camshaft to the first and second cam portions respectively;
a slider housing unit in which the first and second inner brackets are rotatably inserted, a relative position of the slider housing unit with respect to the camshaft being variable;
a control shaft parallel to the camshaft, and a control rod being eccentrically formed on the control shaft;
a lifter on which a lifter hole to be rotatably connected with the control rod is formed and on which a rotation hole where the slider housing unit is rotatably inserted into is formed; and
a control portion configured to selectively rotate the control shaft so as to control a position of the slider housing unit.

13. The engine of claim 12, wherein the slider housing unit comprises:
a connecting pipe inserted into the rotation hole;
a first and a second slider housing bearings inserted into the connecting pipe in which the first and second inner brackets are rotatably inserted respectively; and
an outer slider housing connected with the connecting pipe.

14. The engine of claim 13, wherein the slider housing unit further comprises a spacer disposed within the connecting pipe to inhibit rotations of the first and second inner brackets from being interrupted.

15. The engine of claim 13, wherein
a guide surface is formed to the outer slider housing and configured to guide movement of the slider housing unit; and
a carrier guide surface contacting the guide surface is formed to a cam carrier.

16. The engine of claim 10, wherein
a cam key is formed to the first and second cam portions, respectively;
a first sliding hole is formed to the first and second inner brackets, respectively; and
a cam key pin, on which a cam key slot where the cam key is slidably inserted therein is formed, is rotatably inserted into the each first sliding hole.

17. The engine of claim 16, wherein
a second sliding hole is formed to the first and second inner brackets, respectively;

a camshaft pin is connected to the camshaft; and a slider pin, on which a camshaft pin slot where the camshaft pin is slidably inserted therein is formed, is rotatably inserted into the each second sliding hole.

18. The engine of claim 16, wherein a second sliding hole is formed to the first and second inner brackets, respectively, and wherein the continuous variable valve duration apparatus further comprises a slider pin including a pin body slidably inserted into the camshaft, and a pin head integrally formed with the pin body and rotatably inserted into the second sliding hole.

19. The engine of claim 18, wherein a camshaft oil hole is formed to the camshaft along a length direction thereof;

a body oil hole communicated with the camshaft oil hole is formed to the pin body; and an oil groove communicated with the body oil hole is formed to the pin head.

20. The engine of claim 12, wherein the cam is formed as a pair;

a cam cap connecting portion is formed between the paired cams of at least one of the first cam portion or the second cam portion; and a cam cap configured to rotatably support the control shaft and the cam connecting portion.

* * * * *